US007618005B1

(12) United States Patent
Tafoya (10) Patent No.: US 7,618,005 B1
(45) Date of Patent: Nov. 17, 2009

(54) STEALTH BOMBER, TRANSPORTER, AIR-TO-AIR FUELING TANKER, AND SPACE PLANE

(76) Inventor: Samuel Barran Tafoya, 135-41St Street Cir. East, Bradenton, FL (US) 34208

( * ) Notice: Subject to any disclaimer, the term of this patent is extended or adjusted under 35 U.S.C. 154(b) by 390 days.

(21) Appl. No.: 11/789,718

(22) Filed: Apr. 25, 2007

(51) Int. Cl.
*B64C 1/10* (2006.01)
(52) U.S. Cl. .......................... 244/36; 244/120
(58) Field of Classification Search ............ 244/55, 244/36, 47, 35 R, 119–120
See application file for complete search history.

(56) References Cited

U.S. PATENT DOCUMENTS

| 1,825,301 | A | * | 9/1931 | Beisel | 244/118.5 |
|---|---|---|---|---|---|
| 1,836,928 | A | * | 12/1931 | Mego | 244/5 |
| 1,862,102 | A | * | 6/1932 | Stout | 244/35 R |
| 2,298,040 | A | * | 10/1942 | Davis | 244/35 R |
| 2,982,501 | A | * | 5/1961 | Griffith et al. | 244/119 |
| 3,405,893 | A | * | 10/1968 | Rajau et al. | 244/119 |
| 6,047,923 | A | * | 4/2000 | Lafferty | 244/15 |
| 6,926,232 | B2 | * | 8/2005 | Franchet et al. | 244/53 B |

* cited by examiner

*Primary Examiner*—Tien Dinh
(74) *Attorney, Agent, or Firm*—Dorothy S. Morse (57) ABSTRACT

A stealth transporter aircraft having a rhomboid airframe with a dihedral bottom surface and a top surface designed as an airfoil. The rhomboid cross-sectional configuration of the airframe gives it increased lift, stealth characteristics, and enhanced load bearing capacity. The aircraft does not have conventional wing structure and its dihedral bottom surface allows it to make wheels-up emergency landings on water and hard runway surfaces with greater pilot survivability. A rigid central tubular area extending nearly the full length of the airframe is configured for passengers, luggage, munitions, and/or equipment and provides a backbone for the aircraft. The aircraft further has rear engines, a large fuel carrying capability, and may also undergo primarily interior modifications for function as a space plane or air-to-air fueling tanker. A vortex spoiler on the side edges of the airframe is also preferred, which eliminates trails while in high altitude flight.

20 Claims, 12 Drawing Sheets

STEALTH BOMBER, TRANSPORTER, AIR-TO-AIR FUELING TANKER, AND SPACE PLANE

CROSS-REFERENCES TO RELATED APPLICATIONS

None.

BACKGROUND OF THE INVENTION

1. Field of the Invention

This invention relates to the field of motorized aircraft, specifically to a stealth transporter having a fuselage with a rhomboid cross-sectional configuration, the top surface of which is designed to be an airfoil and the dihedral-shaped bottom surface of which allows the pilot an option for a wheels-up emergency landing on water or a hard runway surface. It further has a central tubular area configured for passengers, luggage, munitions, cargo, and/or other equipment, at least one rear jet or rocket engine positioned within the central tube for easy maintenance access, optional jet engines in outboard relation to the tube, optional retractable take-off and landing modulus, a preferred vortex spoiler option with irregular shaped notches/points along its side edges configured to eliminate trails while in high altitude flight, no conventional wing structure, and large fuel carrying capability. It can be used as a bomber in military applications, and when outfitted with a rocket engine can function as a space plane. The rhomboid cross-sectional configuration and central tube give it increased strength, with the rhomboid cross-sectional configuration also giving it stealth characteristics, increased lift area, and enhanced load bearing capacity.

2. Description of the Related Art

Transporter and bomber aircraft continue to be required for military defense capability. Some disadvantages of currently known bomber and transporter aircraft is that their wing structure prevents compact parking in airfields and around airport terminals, they are not configured for optional wheels-up landing on a hard runway surface, they are not configured for optional wheels-up water landings, unreleased bombs are a detriment to emergency landings, cockpit structure leaves the pilot vulnerable in combat, fuel storage in the wings is vulnerable to attack, extended wing structure inhibits maneuverability, and pilot visibility in a downward direction is restricted. In contrast, the present invention has a specific fuselage configuration that gives it increased strength and load bearing capacity, and provides enhanced downward visibility for the pilot. Since it has no conventional wing structure, storage and handling of the present invention in airfields and around airport terminals is facilitated. Also, its tube structure and positioning thereof safeguards the fuel tank or tanks in and above it, protects the pilot, and makes them all less vulnerable to attack. Further, emergency landings in the present invention are facilitated by the use of several small emergency wheels and a dihedral bottom surface configuration that creates a compressed atmosphere under the airframe, which permits greater pilot and passenger survivability during wheels-up emergency landings on both water and hard runway surfaces where the main landing gear and nose steering wheels have been retracted. There is no aircraft known that has the same features and components as the present invention, nor all of its advantages.

BRIEF SUMMARY OF THE INVENTION

Objectives and Advantages

The primary object of this invention is to provide an aircraft that can be used alternatively with differing internal modifications as a bomber, transporter, air-to-air fueling tanker, and space plane. It is also an object of this invention to provide an airframe with a surface structure having stealth characteristics. A further object of this invention is to provide an airframe that is more easily handled and more compactly parked in airfields and around airport terminals than currently existing bomber and transporter aircraft. It is also an object of this invention to provide an aircraft with combined bomber and transport capabilities which also has increased strength and load bearing capacity when compared to bombers in current use. It is also an object of this invention to provide an airframe that is simpler in structure and less expensive to manufacture than airframes currently used in modern bomber and transporter applications. A further object of this invention is to provide an airframe that gives pilots and passengers greater survivability during wheels-up emergency landings on hard runway surfaces and water. It is also an object of this invention to provide an airframe for military applications with bomb storage in a location that is safer for emergency landings with unreleased bombs than bombers in current use. It is a further object of this invention to provide an airframe that is more maneuverable than bombers in current use. A further object of this invention is to provide an airframe with added protection for the pilot, passengers, and fuel storage areas.

The present invention bomber/transporter aircraft, air-to-air fueling tanker, and space plane is designed to provide a vehicle that takes off and lands without the conventional wing structure that current aircraft have. The entire fuselage is a lifting body due to its rhombus or rhomboid shape. Its top surface is designed to be an airfoil. Take-off and landing of the landing of the present invention can be performed on a hard surface, with emergency landings on hard and water surfaces providing greater pilot and passenger survivability than aircraft in current use. Take-off from a hard surface is conventional in every way, except the forward end uses lifting flaps to break the low pressure adhesion produced by the flat dihedral bottom, which is angled for a water landing and stealth flight. The rear sides of the airframe are further angled in the event of non-routine approach angles. The lifting flaps are also used to keep the nose from diving into the water during emergency landings, and for routine landing control on a conventional runway to hold the nose up. The airframe of the present invention is very strong, primarily due to its rhomboid shape and the tube extending through the airframe front-to-back. Section A-A taken from front-to-rear shows the typical airfoil configuration of the present invention provided in its rhombus/rhomboid shape. The present invention also has an accelerator ramp at its front end that is configured to increase the velocity of air/fluid passing over the top of its fuselage so as to increase the pressure differential between its top and bottom surfaces. This will enhance the lifting capacity of the fuselage at lower take-off speeds. Although the present invention fuselage can be any dimension that accommodates its rhomboid/airfoil configuration, the most preferred embodiment of the present invention is approximately 136 feet wide, approximately 336 feet long, has a central tube that is approximately twenty feet in diameter, and a ground clearance at the centerline of approximately six feet for enhanced ease in loading ordnance. When the tube is at least 250 feet long, it provides a long and protected load carrying space, as well as protection for a pilot, or pilot and crew. Since passengers would be transported within the tube, no windows would be available for their use, and all visibility would be via televisions or other monitors. Efficient parking in airfields and around airport terminals is also an advantage of the present invention since it does not have conventional wings. Further, it is preferred for a vortex spoiler to be used along each side of the fuselage, in a position immediately rearward from the accelerator ramp, to prevent vortex formation when landing and in flight to permit present invention aircraft to follow more closely one behind the other than current aircraft used in commercial, military, air-to-air fueling, and space applications. Spoilers also contribute to stealth flight, by eliminating trails while the present invention is in high altitude flight. Another advantage of the present invention is that it has no wing spars or wing box (which can weigh seven tons in a large plane), as conventional aircraft use, to take up space that is otherwise devoted in the present invention to passengers, load, and/or increased fuel carrying capacity. The tail of the present invention has a rudder and stabilizers that function as elevators and ailerons. The ailerons will effect a roll or bank when in a turn. When used together, and in combination with the front flaps, the ailerons also control climb and attitude when taking off and landing. For movement of the airframe on the ground, the retractable front bogies are steerable. The tube could easily be sectioned off as desired front-to-back with airtight bulkheads, however, it should not be cut or sectioned since it provides the back bone of the aircraft, and its rigidity is very important to the present invention structure. The great strength of the present invention does not sacrifice weight. In fact, when the present invention is compared to a B52 bomber, the present invention is considerably lighter than a B52 bomber and can carry a much heavier load. At the same time, the present invention is much less costly to construct and operate than a B52 bomber. The fuel spaces in the present invention are abundant, and typically protected from ground fire. The structure needed to raise and lower the landing gear can also be designed with great strength since there is sufficient space in the fuselage for its retraction. Further, the fuselage has three wheels for wheels-up emergency landing, all on the centerline of the aircraft. One is in the nose of the aircraft, one in the middle section, and the third at the tail. The rear emergency wheel also prevents the tail of the present invention from dragging on a steep take-off or landing. Further, there is no kick-up at the tail bottom, as in conventional aircraft. Thus, more space is available in the present invention for its rear engines. In addition, since wings are not used in the present invention for engine support, safety is enhanced for water ditching or the possibility of a wing being shot off, as in combat or from ground fire.

While the description herein provides preferred embodiments of the present invention airframe, it should not be used to limit its scope. For example, variations of the present invention, while not shown and described herein, can also be considered within the scope of the present invention, such as variations in the materials from which the components of the present invention can be made; the size and perimeter configuration of many of the present invention components; as well as the relative positioning of some present invention components. Thus, the scope of the present invention should be determined by the appended claims and their legal equivalents, rather than being limited to the examples given.

LIST OF COMPONENTS

2—Airframe/fuselage of the most preferred embodiment of the invention
4—Accelerator ramp/area
6—Waterline
8—Tube centrally located within the airframe and providing its backbone
10—Pilot
12—Air intake to engines
14—Front emergency landing wheel
16—Middle emergency landing wheel
18—Rear emergency landing wheel
20—Rudder
22—Jet engine
24—Vortex spoiler with irregular notches/points
26—Elevators
28—Lifting flaps
30—Work Line
32—Centerline
34—Rocket Fuel Tank
36—Rocket Fuel Mixing Chamber
38—Rocket Engine
40—Windshield/canopy
42—Dihedral surface configuration
44—Retractable nose steering assembly (bogie)
46—Retractable main landing gear
48—Rudder/Stabilizer
50—Loaded ordnance positions
52—Jet fuel tank
54—Cargo/luggage loading door
56—Passenger ramp and outer cargo/luggage loading door
58—Portion of central tube configured as a passenger/cargo area
60—Portion of central tube configured as a bomb bay
62—Rebound
64—Jounce
66—Nose steering assembly (bogie) in a stored/retracted position
68—Hydraulic cylinder
70—Clearance at jounce
72—Outboard nose wheel well cover/faring
74—Inboard nose wheel well cover/faring
76—Inner bomb bay door
78—Outer bomb bay door
80—Isolation spacers for fuel tank safety
82—Outboard main wheel well cover/faring
84—Inboard main wheel well cover/faring
86—Angled rear surface providing clearance for improper/non-routine approach angle
88—Lift-off/landing waterline of approximately 12 degrees
90—Smaller front end portion of the central tube housing cockpit for pilot
92—Inner skin/surface
94—Smaller rear end portion of the central tube
96—Nose/front end of airframe
98—Tail/rear of airframe
Line A—Centerline of airframe, shown as a top line of the airframe in side views
Line B—Line of the airframe forming the top of Section A-A in side views
Line B'—Tangent point for the faring surface in the accelerator ramp area joining Line B
Line/Point C—Side edge of the airframe that extends from nose to tail
Line D—Theoretical line opposite Line B forming the bottom of Section A-A in side views
Line E—Bottom line of the airframe in side views

DETAILED DESCRIPTION OF THE INVENTION

FIGS. 1-15 show the most preferred embodiments of the airframe/fuselage 2 for the bomber/transporter aircraft of the present invention, which can also be outfitted with a rocket engine 38 (see FIG. 9) to provide space plane capability. Airframe/fuselage 2 has a rhombus or rhomboid shape that causes its entire fuselage to be a lifting body. Its top surface is also designed to be an airfoil so that it takes off and lands without the conventional wing structure that current aircraft have. Further, take-off and landing of the present invention airframe 2 can be performed on a hard surface, with emergency landings on hard and water surfaces providing greater pilot 10 and crew/passenger survivability than aircraft in current use. Take-off from a hard surface for airframe 2 is conventional in every way, except the nose/front end 96 uses lifting flaps 28 (shown in FIGS. 8, 10, and 11) to break the low pressure adhesion produced by the flat dihedral bottom configuration (shown in FIG. 9 by the number 42), which is angled at least in part to provide for a water landing and stealth flight, with the flaps 28 thereby providing a drag-minimizing and fuel saving upward nose/front end 96 movement during take-off instead of the downward tail 98 movement typically witnessed in current airframe take-offs. The lifting flaps 28 are also used to keep the nose/front end 96 of airframe 2 from diving into the water during emergency landings, and for routine landing control on a conventional runway to hold nose/front end 96 up. The tail/rear 98 of airframe 2 is further angled laterally (see area designated by the number 86 in FIG. 11) in the event non-routine approach angles are used by pilot 10. The airframe 2 of the present invention is very strong, primarily due to its rhomboid shape and the tube 8 extending substantially through the nose 96 of airframe 2 to its tail 98. FIG. 4 shows Section A-A taken from front-to-rear to reveal the typical airfoil configuration of the present invention provided as a part of its rhombus/rhomboid shape. The Lines B and D (marked in FIGS. 1 and 4), respectively, show the upper and lower boundaries of Section A-A. The present invention also has an accelerator ramp 4 at its nose/front end 96 that is configured to increase the velocity of air/fluid (not shown) passing over the top of its fuselage so as to increase the pressure differential between its top and bottom surfaces (marked by the Lines A and E in FIG. 1, which respectively define the upper and lower limits of the centerline 32 of airframe/fuselage 2). Accelerator ramp 4 is configured to enhance the lifting capacity of airframe/fuselage 2 at lower take-off speeds. Although the present invention airframe/fuselage 2 can be any dimension that accommodates its rhomboid/airfoil configuration, the most preferred embodiment of the present invention airframe 2 is approximately 136 feet wide, approximately 336 feet long, has a central tube 8 that is approximately twenty feet in diameter and easily pressurized, and a ground clearance at the centerline 32 of approximately six feet which aids in loading ordnance when airframe 2 is used as a bomber. Further, an airframe 2 having such dimensions would have a lift area of at least 45,000 square feet, and its accelerator ramp 4 causing an air pressure differential between the bottom and top surfaces (marked by Lines A and E) of airframe 2 of approximately six pounds per square inch, resulting in approximately 14 pounds per square inch of air pressure against the bottom of airframe 2 and approximately eight pounds per square inch of air pressure against the top of airframe 2, and allowing airframe 2 to provide a lifting capability of nearly 700,000 tons. When the tube 8 of airframe/fuselage 2 is at least 250 feet long, it provides a long and protected load carrying space for bombs and other cargo, as well as protection for a pilot 10, or pilot 10 and crew. Since passengers would be transported within tube 8 when airframe 2 is used as a transporter, no windows would be available for their use, and all visibility would be via televisions or other monitors (not shown). Efficient parking in airfields and around airport terminals is also an advantage of the present invention airframe 2 since it does not have a conventional wing structure, and does not require a wing box. Further, it is preferred for a vortex spoiler 24 to be used along each side of airframe/fuselage 2, in a position immediately rearward from the accelerator ramp 4 (typically starting after the Section F, as shown in FIG. 2), to prevent vortex formation when landing and in flight to permit multiple present invention aircraft to follow more closely one behind the other than current aircraft used in commercial, military, air-to-air fueling, and space applications. Also, spoilers contribute to stealth flight by eliminating trails while in high altitude flight. Another advantage of the present invention is that it has no wing spars, as conventional aircraft use, to take up space that is otherwise devoted in the present invention to passengers, load, and/or increased fuel carrying capacity. The tail/rear 98 of the present invention has a rudder 20 and stabilizers 26 that function as elevators and ailerons. The ailerons will allow airframe 2 to effect a roll or bank when in a turn. When used together, the ailerons 26 also control climb and altitude when taking off and landing. For movement of airframe 2 on the ground, the retractable front bogies 44 are steerable. Also, tube 8 could easily be sectioned off as desired front-to-back with airtight bulkheads (not shown), however, tube 8 should not be cut or sectioned since it provides the back bone of aircraft 2, and the rigidity of tube 8 is very important to the present invention structure. In addition, the great strength of the present invention does not sacrifice weight. In fact, when the present invention airframe 2 is compared to that of a B52 bomber, the present invention airframe 2 is considerably lighter than a B52 bomber and can carry a much heavier load.

At the same time, the present invention airframe 2 is much less costly to construct and operate than a B52 bomber. The fuel spaces in the present invention airframe 2 are abundant, and typically protected from ground fire by tube 8. The structure needed to raise and lower the landing gear can also be designed with great strength since there is sufficient space in the fuselage 2 for its retraction. Further, the fuselage 2 has three wheels (marked respectively as 14, 16, and 18 in FIGS. 1-3) for wheels-up emergency landing, all on the centerline 32 of the aircraft (the upper and lower limited of which are defined by the Lines A and E in FIGS. 1 and 9. One emergency landing wheel 14 is in the nose/front end 96 of airframe 2, a second emergency landing wheel 16 is in the middle section of airframe 2, and the third emergency landing wheel 18 at the tail/rear 98 of airframe 2. The rear emergency wheel 18 also prevents the tail/rear 98 of the present invention airframe 2 from dragging on the ground during a steep take-off or landing. Further, there is no kick-up at the bottom of tail 98, as in conventional aircraft. More space is also available in the present invention than conventional aircraft for its rear jet engines 22 (shown in FIGS. 1, 3, 10, 11, and 15), with some jet engines being shown positioned within tube 8 and others positioned outboard from tube 8 (see FIG. 15). In addition, since conventional wings are not used in the present invention for jet engine 22 support, safety is enhanced for water ditching or the possibility of a wing and/or engine 22 being shot off, as in combat or from ground fire. Throughout the illustrations herein, the industry standard centerline 32, work line 30, and water line 6 references are used, with the centerline 32 in side views defined at its top end by Line A and its bottom end defined by Line E. Further, the sides of air frame 2 are substantially symmetrical with one another, and unless otherwise noted or shown, a symmetrical configuration should be assumed. Also, although shown together in FIG. 12 to depict varying uses, the bomb storage detailed on the left half 60 of tube 8 would never exist side-by-side with the passenger areas detailed on the right half 60 of tube 8. In addition, and for general clarity of illustration, in most instances only the inner skin of airframe 2 is shown in the accompanying illustrations, with the exception of FIGS. 12, 13, and 14 where the inner and outer skin surfaces are shown together as a double line. In all instances, whether it is shown or not, the outer skin surface of airframe 2 will be assumed to have appropriate design thickness and armament.

Figure 1:
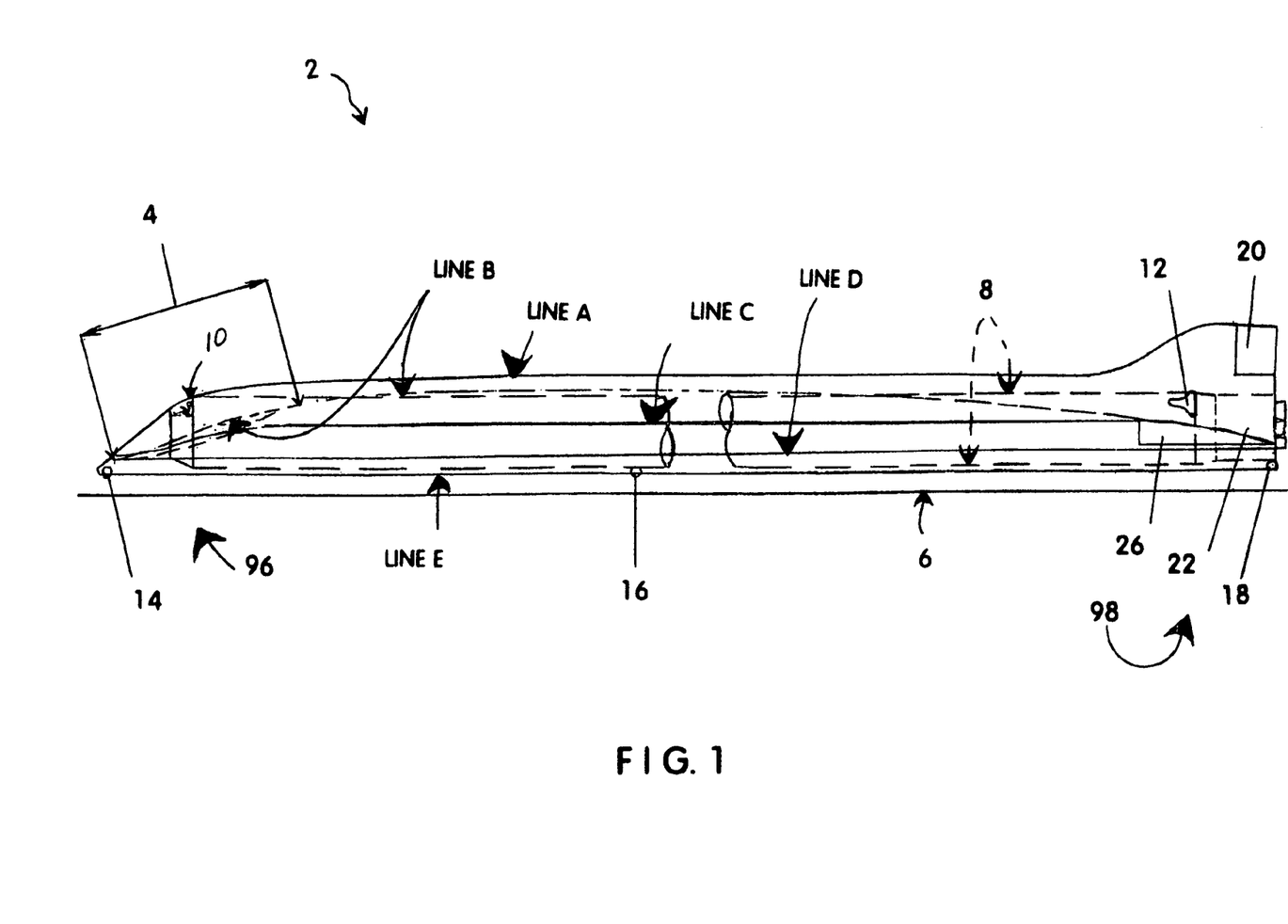
FIG. 1 is a side view of the most preferred embodiment of the present invention with the location of its central tube, accelerator area, and emergency wheels being identified.
Figure 2:
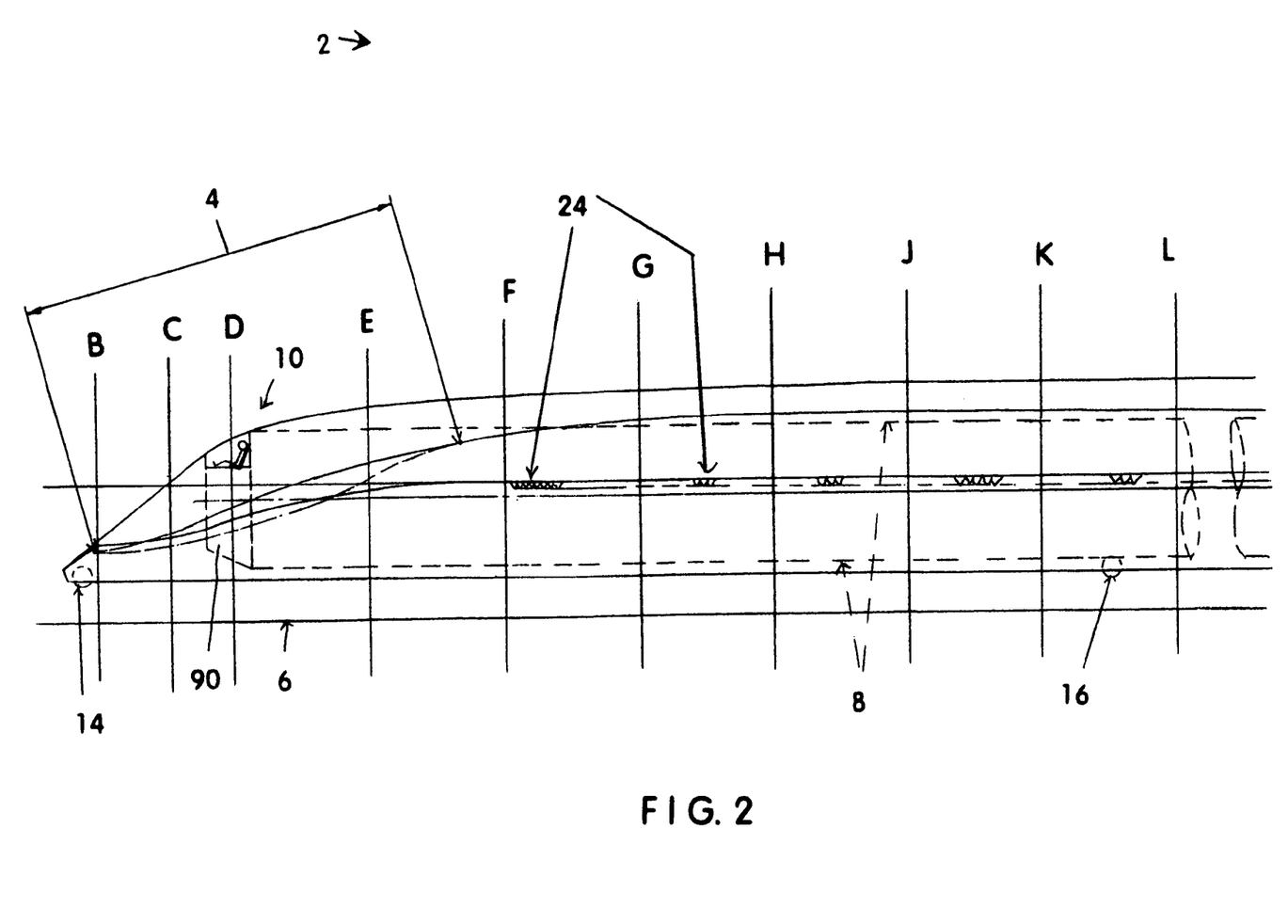
FIG. 2 is an enlarged side view of the most preferred embodiment of the front end of the present invention with numbered Sections B-L identified, and the preferred locations of its vortex spoiler shown rearward from Section F.
Figure 3:
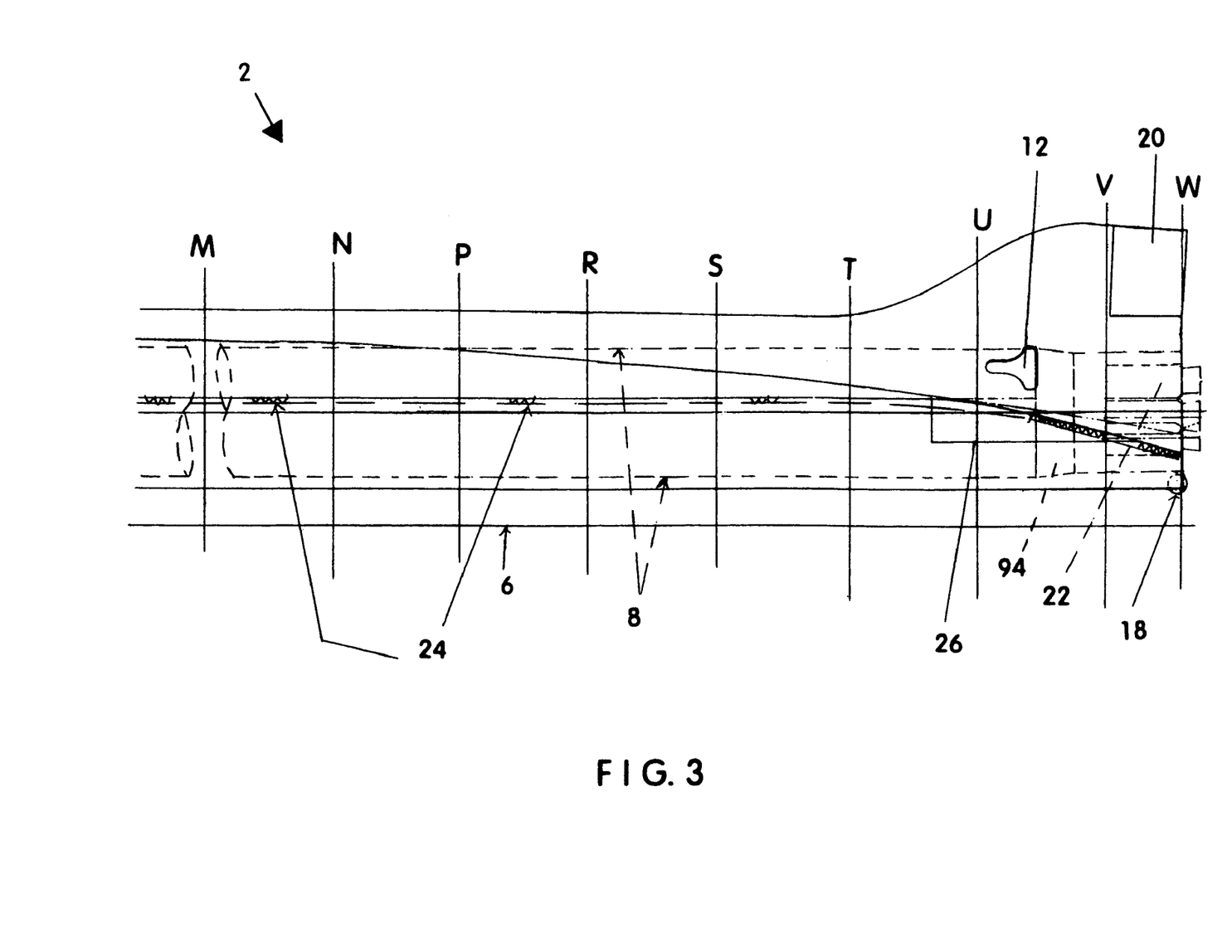
FIG. 3 is an enlarged side view of the most preferred embodiment of the rear end of the present invention with numbered Sections M-W identified, and the preferred locations of its jet engines, air intake, rudder, elevator, and vortex spoiler shown.
Figure 4:
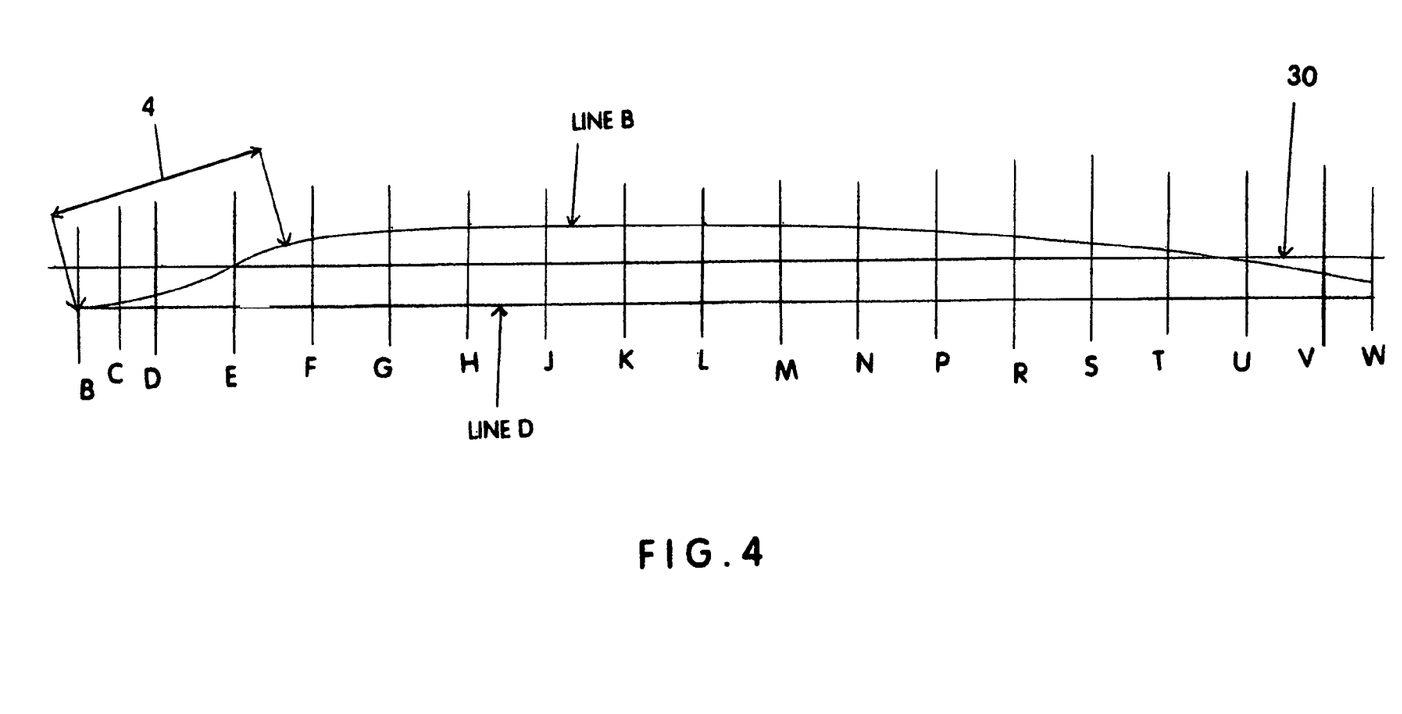
FIG. 4 is a side view of the conventional airfoil configuration of Section A-A in the most preferred embodiment of the present invention defined by lines B and D, with the locations of the front accelerator area and Sections B-W also identified.
Figure 14:
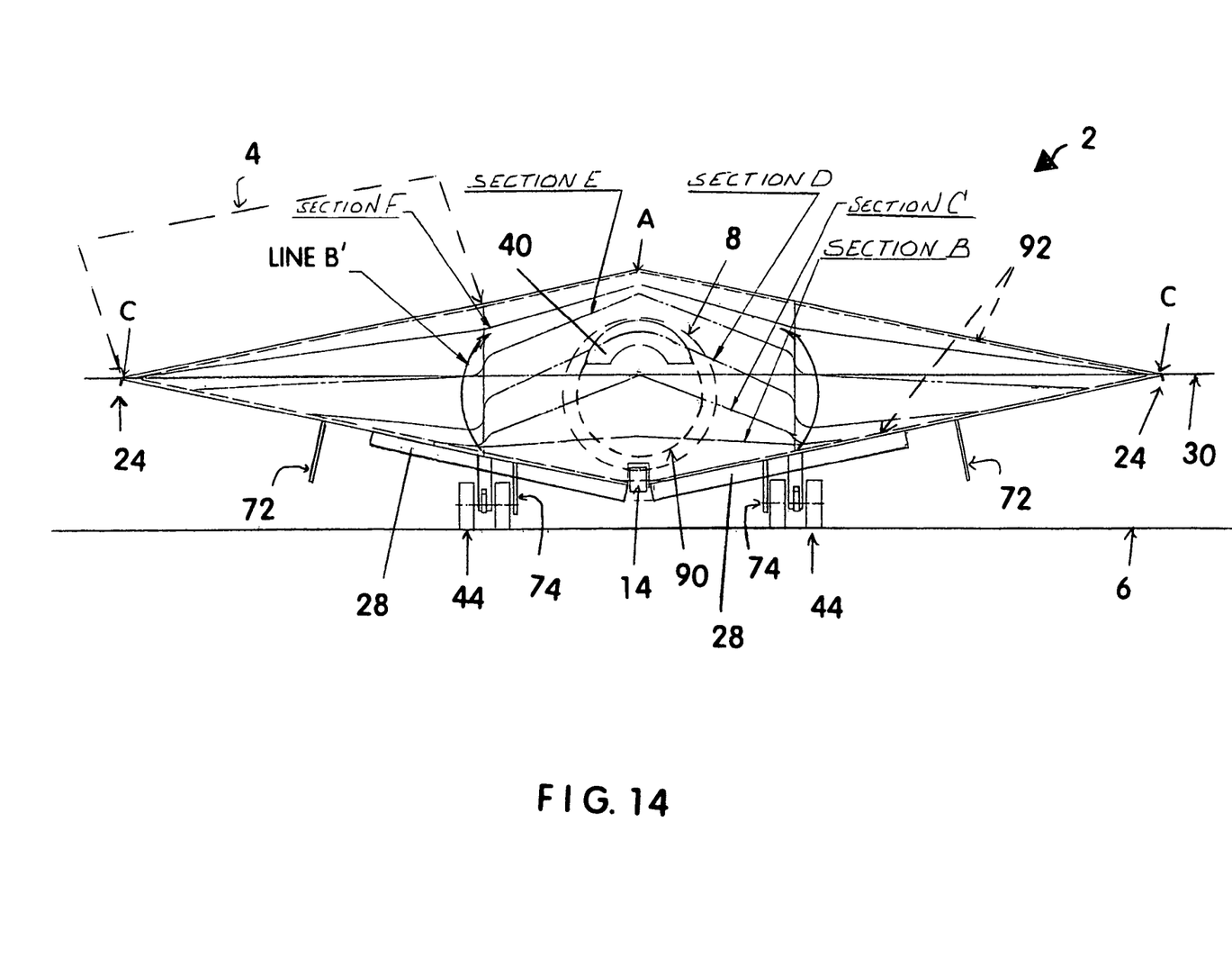
FIG. 14 is a front end view of the most preferred embodiment of the present invention with its Sections B-F, central tube, retractable nose steering assemblies, emergency nose wheel, lifting flaps in a down position, wheel well covers/farings, acceleration area, windshield/canopy for the pilot, and vortex spoiler, and work line reference also identified.
Figure 15:
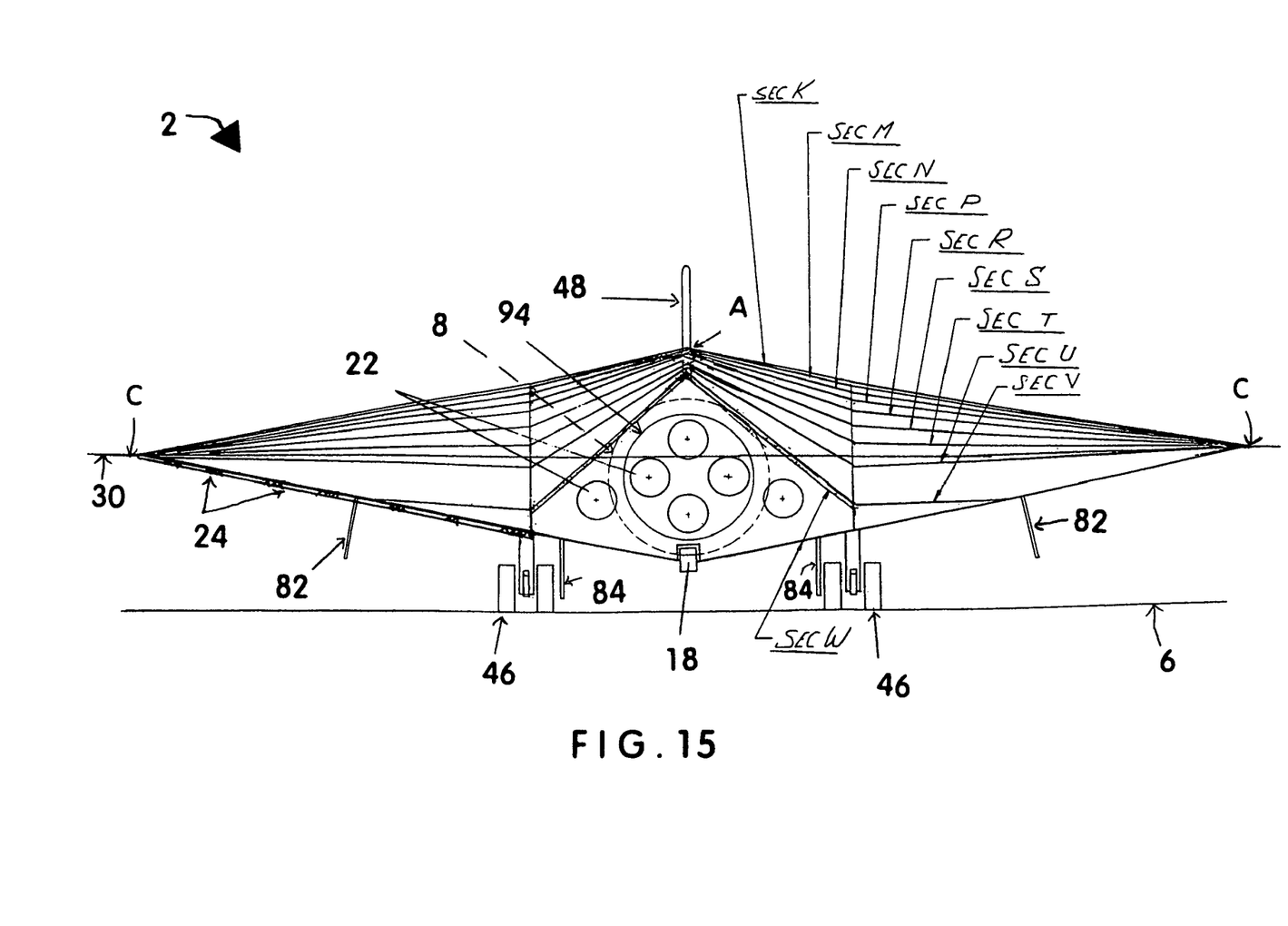
FIG. 15 is a rear view of the most preferred embodiment of the present invention with its Sections K-W, central tube, jet engines inside and outside the tube, rear emergency wheel, retractable main gear, wheel well covers/farings, rudder/stabilizer, work line reference, and vortex spoiler shown at the trailing edge on one side also identified.

FIGS. 1-3 each show a side view of the most preferred embodiment of the present invention airframe 2, with FIGS. 2 and 3 showing enlarged views of airframe 2 to provide additional clarification of its preferred features and components. The lifting flaps 28 (located approximately in the area of Section E), retractable nose steering assembly 44 (located approximately in the area of Section H), and retractable main landing gear 46 located approximately in the area of Section T), which are shown in other drawings, are not shown in FIGS. 1-3 for clarity of illustration, particularly to avoid conflict and confusion with the Section lines shown in FIGS. 2 and 3. FIGS. 1 and 2 show the front portion (including nose 96) of the present invention airframe 2 with numbered Sections B-L identified in FIG. 2, and FIGS. 1 and 3 show the rear portion (including tail 98) of the present invention airframe 2 with numbered Sections M-W identified in FIG. 3. The alphabetic designation of Sections is also used in FIGS. 4, 9-11, and 14-15 for additional reference. In addition FIGS. 2 and 3 show preferred location of a vortex spoiler 24, since it would be too small for clear designation in FIG. 1, with FIG. 2 showing vortex spoiler 24 starting rearward from Section F and FIG. 3 showing it continuing rearward to the tail/rear 98 of airframe 2. For clarity of illustration, non-continuous spoiler 24 markings are shown. However, it is to be understood that spoiler 24 extends continuously from Section F rearward to the trailing edge. The shape and spacing of the blades comprising spoiler 24 are irregular to prevent vortex formation when landing and in flight to permit multiple present invention aircraft to follow more closely one behind the other than current aircraft used in commercial, military, air-to-air fueling, and space applications. Also, spoilers 24 contribute to stealth flight by eliminating trails while in high altitude flight. FIG. 3 also shows the preferred locations of jet engines 22 (rearward from Section U, with Section U representing the front edge of the engine room), an air intake 12 (rearward from Section U) for jet engines 22, 22, rudder 20 (rearward from Section V), and elevator 26 (near Section U). Air intake 12 preferably has the keyhole configuration described in U.S. Pat. No. 6,699,087 to Tafoya (2004). As can be seen in FIGS. 1 and 15, most jet engines 22 are positioned within tube 8, which extends between Sections D and V. However, FIG. 15 shows that an option exists for jet engines 22 to be positioned outboard from tube 8. It should be noted that the line 22 in FIG. 3 extends to only one of the engines 22 present for clarity of illustration. The central tube 8 within airframe 2, which provides the structural backbone of airframe 2 and substantially fills airframe 2 between Lines A and E, is shown in FIGS. 1-3 with broken lines and marked with arrows delineating its topmost and bottommost edges. As shown in FIGS. 1 and 2, pilot 10 is located in a reduced diameter forward tube section near Section D (marked by the number 90 in FIG. 2), while FIGS. 1 and 3 show a reduced diameter rear tube section between Sections U and V (marked by the number 94 in FIG. 3). Air intake 12 is positioned forward from reduced diameter rear tube section 94. FIGS. 1 and 2 further show accelerator area/ramp 4 near the nose/front end 96 of airframe 2, with FIG. 2 showing it starting slightly forward of Section B and ending between Sections E and F. Accelerator area/ramp 4 provides air pressure reduction for airframe/fuselage 2. FIGS. 1-3 also show spaced apart emergency landing wheels 14, 16, and 18 under airframe/fuselage 2, with emergency landing wheel 14 being positioned near to Section B, emergency landing wheel 16 being positioned between Sections K and L, and emergency landing wheel 18 being positioned near to Section W. FIGS. 14 and 15 reveal that a single wheel 14 and a single wheel 18 are used along the centerline 32 of airframe 2 (although centerline 32 was removed from FIGS. 14 and 15 for clarity of illustration). Although it is also contemplated for a single emergency wheel 14, 16, or 18 to be used in the most preferred embodiment of the present invention, neither the total number of emergency wheels 14, 16, 18, or other, used, nor wheel positioning, are limited to that shown in the accompanying illustrations. FIG. 1 further shows Lines A-E that are used to identify certain areas of airframe 2 having significance. Lines A and E respectively represent the top and the bottom of the centerline 32 of airframe and are shown in FIG. 1. Lines B and D, respectively, represent the upper and lower lines defining the airfoil Section A-A (shown in FIG. 11) in the present invention which results in the image shown in FIG. 4, with Line D representing a theoretical line opposite Line B. In addition, FIG. 1 shows Line C as representing the side edge of airframe/fuselage 2 that extends from nose 96 to tail 98. The number 6 is also shown in FIGS. 1-3 and represents the reference water line of airframe 2. As shown in FIG. 12, fuel for jet engines 22 is typically stored in one or more fuel tanks 52 located above tube 8.

Since the entire airframe 2 of the present invention is used as an airfoil, FIG. 4 provides a side view of the conventional airfoil configuration of Section A-A, the upper and lower limits of which are defined by lines B and D. Further views of the airfoil configuration of airframe 2 are shown in FIGS. 5-9. The alphabetic designation of Sections B-W is also marked in FIG. 4 for reference and comparison to other illustrations herein. FIG. 4 further shows the location of the front accelerator ramp/area 4, which extends from Section B rearward to a location between Sections E and F. Thus, as is shown in FIG. 2, wherein pilot 10 is located at approximately Section D, the accelerator ramp/area 4 in the nose/front end 96 of airframe 2 extends rearward beyond the location of pilot 10. A work line 30 is also provided in FIG. 4 for reference comparison to other illustrations.

Figure 5:
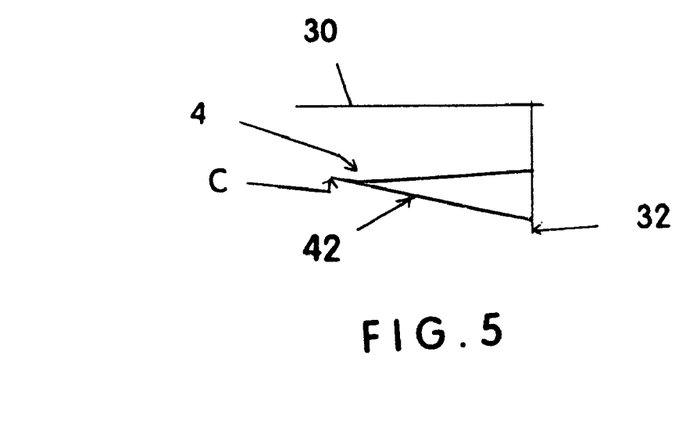
FIG. 5 is a cross-sectional view of the side configuration of most preferred embodiment of the present invention at its Section B, with the location of the front accelerator area also identified and the locations of the centerline and work line further provided for reference and comparison to other cross-sectional views.
Figure 6:
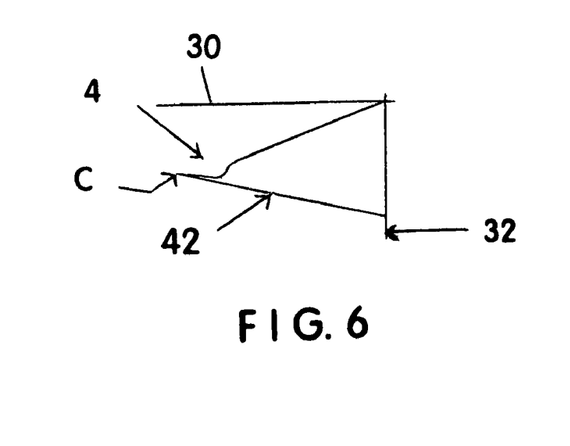
FIG. 6 is a cross-sectional view of the side configuration of most preferred embodiment of the present invention at its Section C with the location of the front accelerator area also identified and the locations of the centerline and work line further provided for reference and comparison to other cross-sectional views.
Figure 7:
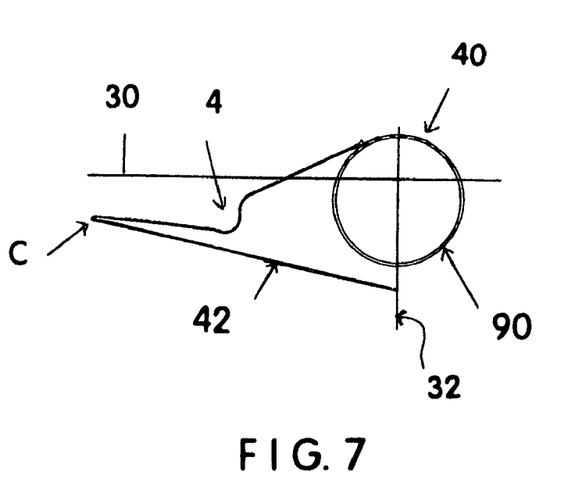
FIG. 7 is a cross-sectional view of the side configuration of most preferred embodiment of the present invention at its Section D with the locations of the front accelerator area, central tube, and canopy/windshield area also identified, and the locations of the centerline and work line further provided for reference and comparison to other cross-sectional views.
Figure 8:
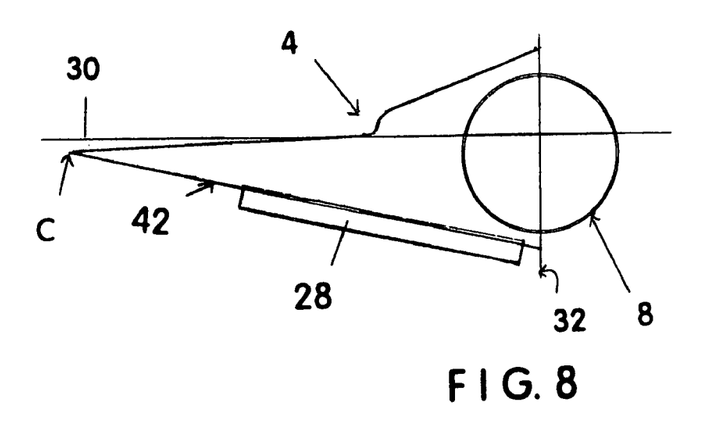
FIG. 8 is a cross-sectional view of the side configuration of most preferred embodiment of the present invention at its Section E with the locations of the front accelerator area, central tube, and lifting flap shown in its down position also identified, and the locations of the centerline and work line further provided for reference and comparison to other cross-sectional views.
Figure 9:
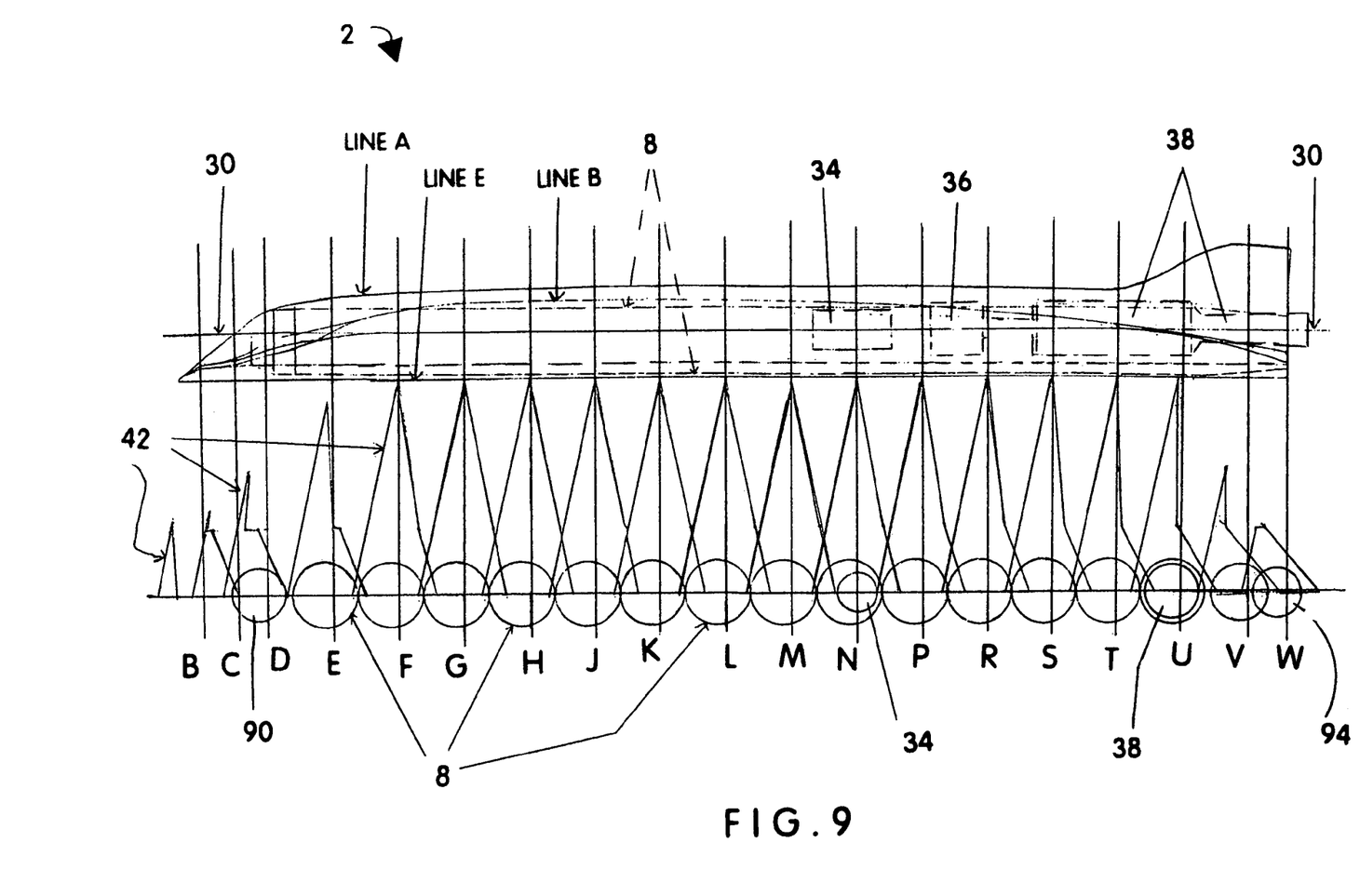
FIG. 9 provides at the top of the drawing sheet a side view of the most preferred embodiment of the present invention airframe configured with a rocket engine for use as a space plane, and under the airframe illustration FIG. 9 also provides sectioned views of one of the airframe's sides and its central tube that reveal the relative size and configuration of each at the different Sections B-F.

FIGS. 5-9 show the bottom dihedral surface configuration 42 of the lateral portion on one side of airframe 2 at each Section B-W, as well as the configuration and positioning of tube 8 relative to the dihedral surface configurations 42 between Sections C and V. Accelerator ramp/area 4, centerline 32, the side edge C of airframe 2, and work line 30 are also marked in FIGS. 5-8. Sections B-E are individually shown in FIGS. 5-8, with the bottom dihedral surface configurations 42 also being repeated in FIG. 9 to provide an easier comparison to the dihedral surface configurations 42 in the other Sections F-W. FIG. 5 shows a cross-section of the airframe 2 on one of its sides between Point C and centerline 32 at its Section B. No tube 8 is present, as by referring to FIG. 2 one can see that the forward most portion of reduced forward tube end 90 is located between Sections C and D. In Section B, the front accelerator ramp/area 4 is shown to be a small upward bend in the upper surface of dihedral surface configuration 42, with the accelerator ramp/area 4 positioned remotely from centerline 32. Also, the top surface of dihedral surface configuration 42 shown in FIG. 5 remains below work line 30. FIG. 6 shows a cross-section of the airframe 2 on one of its sides between Point C and centerline 32 at its Section C. Again, tube 8 is not shown, as it first appears between Sections D and E. The accelerator ramp/area 4 in FIG. 6 is larger in height dimension than that shown in FIG. 5, with the largest height difference positioned approximately double the distance of that in FIG. 5 to centerline 32. Also, the top surface of dihedral surface configuration 42 shown in FIG. 6 is close to work line 30. FIG. 7 shows a cross-section of the airframe 2 on one of its sides between Point C and centerline 32 at its Section D. Although tube 8 is not shown, the reduced forward tube end 90 with its windshield/canopy 40 is visible spanning the intersection of the horizontally-extending work line 30 and the vertically-extending centerline 32. The front accelerator ramp/area 4 in FIG. 6 is approximately double the height dimension of that shown in FIG. 6, with the largest height difference positioned approximately double the distance of that in FIG. 6 to centerline 32. Also, the top surface of dihedral surface configuration 42 shown in FIG. 7 extends above work line 30, but not above canopy/windshield 40. FIG. 8 shows a cross-section of the airframe 2 on one of its sides between Point C and centerline 32 at its Section E. Tube 8 is shown spanning the intersection of the horizontally-extending work line 30 and the vertically-extending centerline 32, and substantially filling the portion of the dihedral surface configuration 42 at centerline 32. The front accelerator ramp/area 4 in FIG. 6 is closer in height dimension to that shown in FIG. 6, with the largest height difference positioned approximately double the distance of that in FIG. 6 to centerline 32. Also, the top surface of dihedral surface configuration 42 shown in FIG. 8 extends above work line 30 and above tube 8. In addition, FIG. 8 shows the lifting flap 28 in its down position relative to dihedral surface configuration 42. In contrast, at the top of the drawing sheet, FIG. 9 provides a side view of the most preferred embodiment of the present invention airframe/fuselage 2 configured with a rocket engine 38 for use as a space plane. Tube 8 is also shown, as well as work line 30 Lines A, B, and E. Further, the preferred positioning of a rocket fuel tank 34 and rocket fuel mixing chamber 36 within tube 8 is also shown. Under the airframe illustration in FIG. 9, sectioned views of all of the dihedral surface configurations 42 in Sections B-W are also provided for one of the sides of airframe/fuselage 2. More detail about Sections B-E were previously shown in the enlarged views of FIGS. 5-8. Sectioned views of tube 8, reduced size front tube end 90, reduced size rear tube end 94, rocket fuel tank 34, and rocket engine 38 are also provided in FIG. 9 for reference and comparison. FIG. 9 shows the intended cross-sectional uniformity of tube 8 throughout most of airframe/fuselage 2, between reduced size front tube end 90 and reduced size rear tube end 94. The representations and positioning in FIG. 9 for the rocket fuel tank 34, rocket fuel mixing chamber 36, and rocket engine 38 are for illustrative purposes only, and the present invention may have other similar features not shown.

Figure 10:
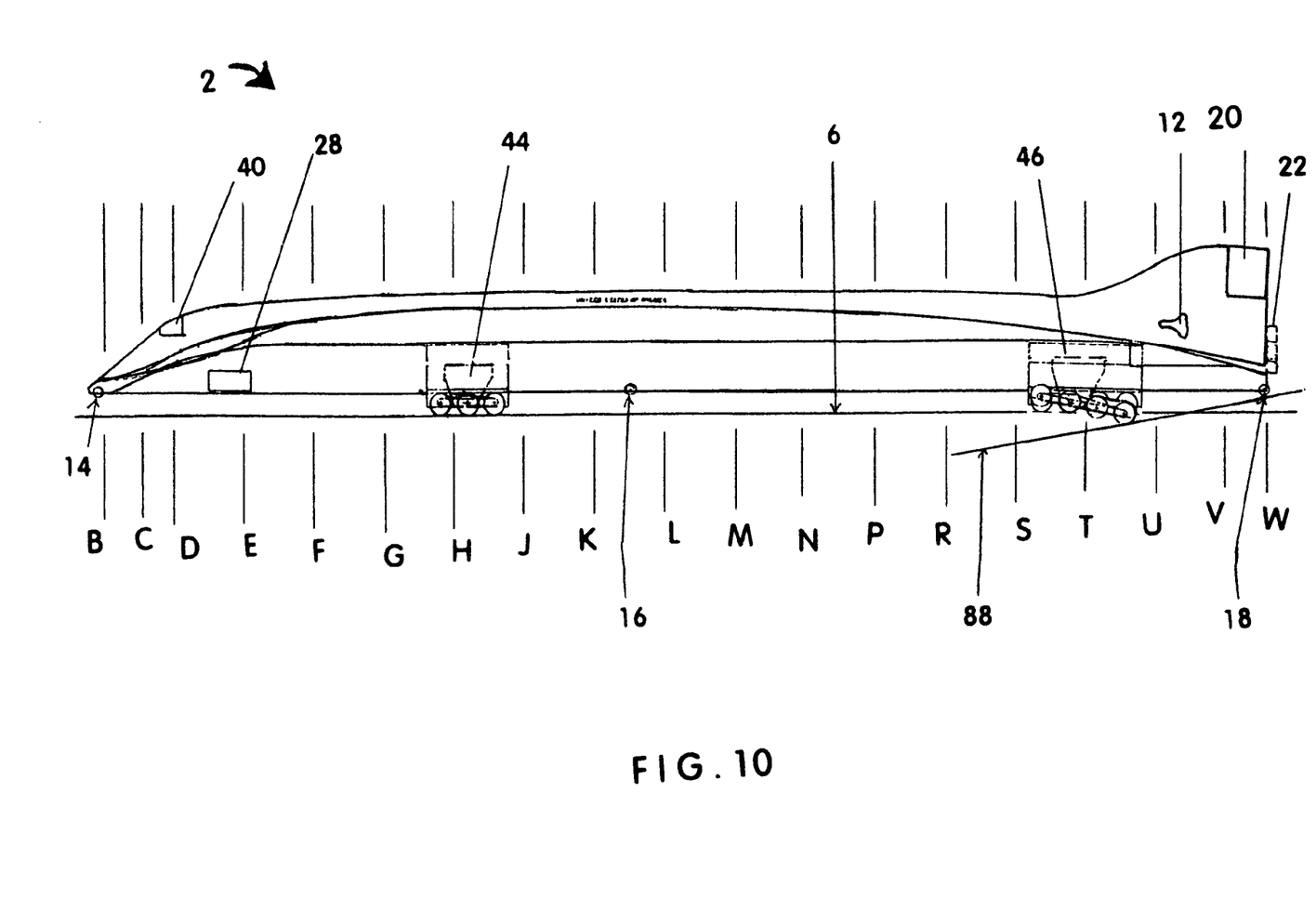
FIG. 10 is a side view of the most preferred embodiment of the present invention with its Sections B-W identified, with the locations of its retractable main landing gear, lifting flap, retractable nose steering assembly, canopy/windshield, and the take-off/landing waterline of approximately 12 degrees also identified.

FIG. 10 shows a side view of the most preferred embodiment of the present invention with its Sections B-W identified. The preferred locations of emergency wheels 14 (forward of Section B), 16 (between Sections K and L), and 18 (approximately at Section W) are also identified. The preferred location of the retractable nose steering assembly 44 of airframe/fuselage 2 is shown in FIG. 10 between Sections G and J and the preferred location of the retractable main landing gear 46 of airframe/fuselage 2 is shown between Sections S and U. In addition FIG. 10 shows the canopy/windshield 40 of airframe/fuselage 2 approximately positioned at Section D and lifting flap 28 approximately positioned at Section E below the accelerator ramp/area 4 and canopy/windshield 40. Accelerator ramp/area 4 is not marked in FIG. 10 for clarity of illustration (mainly to avoid confusion with the lines marking Sections B-F), but can be seen in FIGS. 1 and 2. FIG. 10 further shows the water line 6 under retractable nose steering assembly 44 and a take-off/landing waterline 88 of approximately 12 degrees under retractable main landing gear 46, which primarily absorbs the shock of landing airframe/fuselage 2. The rudder 20, air intake 12, and jet engines 22 are also shown in FIG. 10 with general positioning and detail similar to that shown in FIG. 1.

Figure 11:
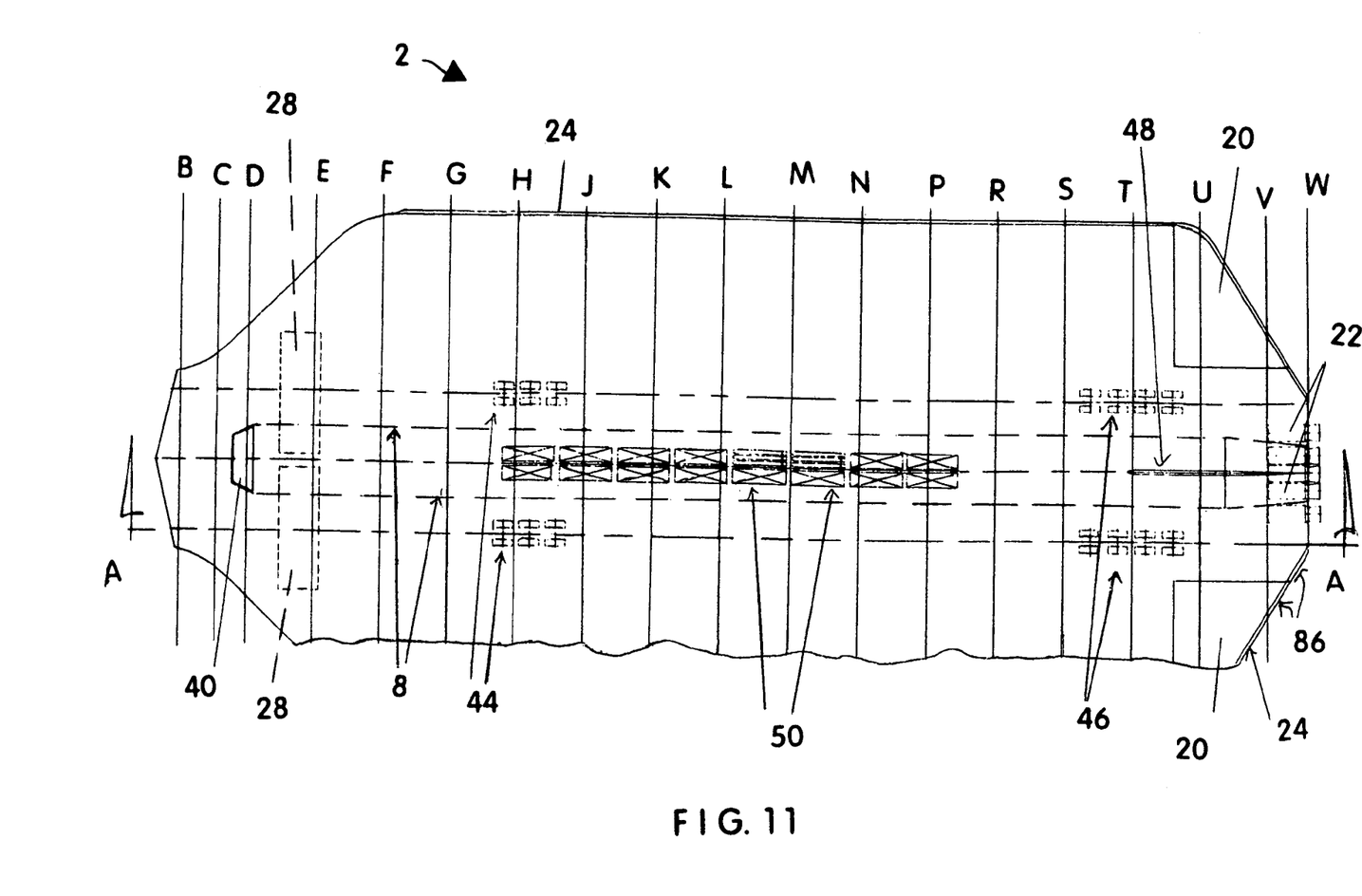
FIG. 11 is a plan view of the most preferred embodiment of the present invention with the locations of its Sections B-W, central tube, lifting flaps, retractable main landing gear, retractable nose steering assemblies, bomb storage area within the central tube, rudders, jet engines, vortex spoiler from Section F rearward, and angled rear surface providing clearance for improper/non-routine approach angle and elevator protection also identified.
Figure 12:
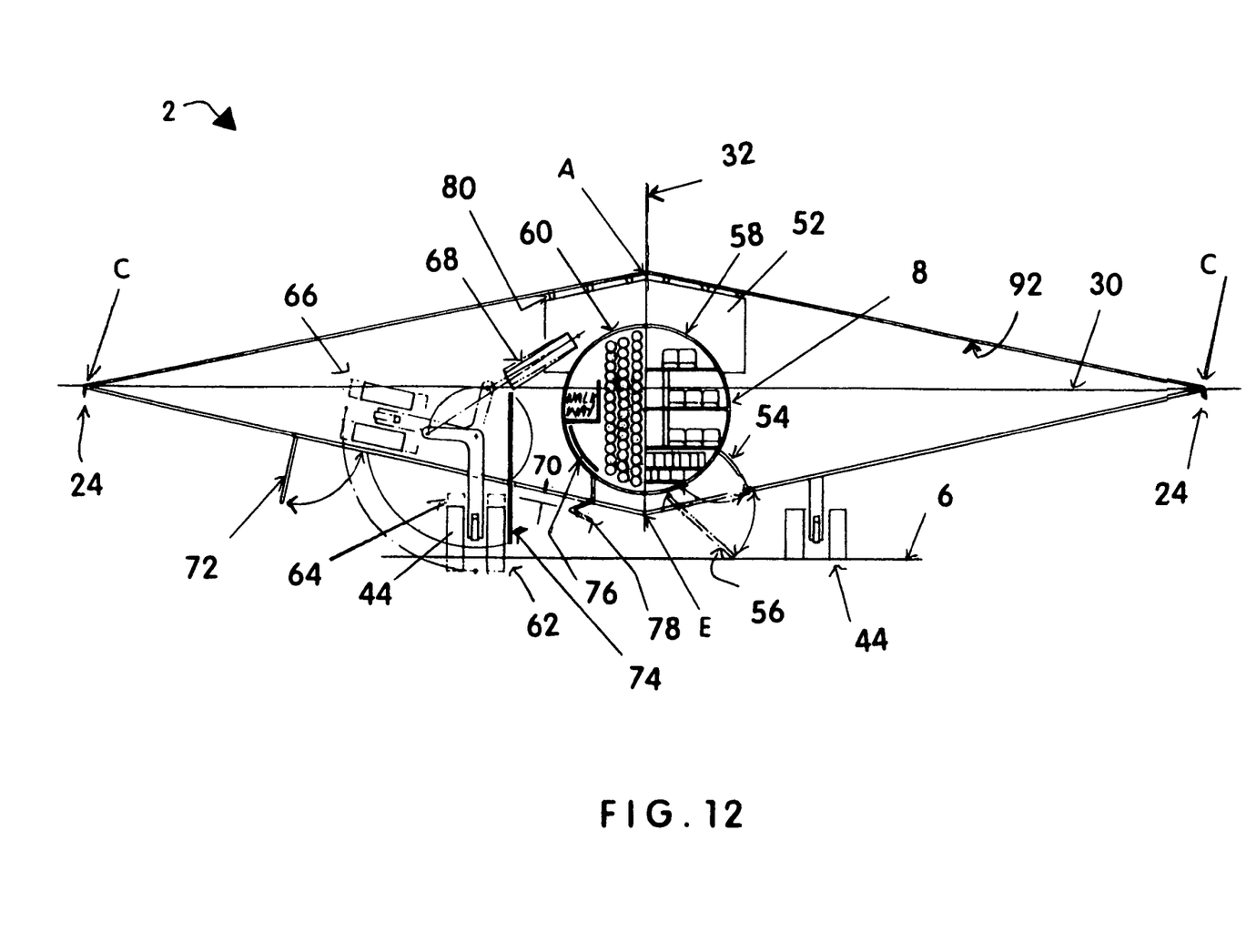
FIG. 12 is a cross-sectional view of the most preferred embodiment of the present invention at its Section H, with its central tube, passenger area, cargo area, bomb bay, fuel storage area, retractable nose steering assemblies, wheel well covers/farings, bomb bay doors, inner cargo door, and outer cargo door that further functions as a passenger ramp, vortex spoiler locations, jounce and rebound geometry for one nose steering assembly, jounce clearance to the airframe, and centerline and work line references also identified.

FIG. 11 is a plan view of the most preferred embodiment of the present invention with preferred locations and configurations of its retractable main landing gear 46 (between Sections S and U) and retractable nose steering assemblies 44 (between Sections G and J), bomb storage area 50 (extending approximately from Section H to Section P) within the central tube 8, and the locations of its Sections B-W identified front to rear. FIG. 11 shows lifting flaps 28 near to the canopy/windshield 40, lifting flaps 28 extending laterally beyond central tube 8 (near Section E), retractable main landing gear 46 located outside of tube 8, retractable nose steering assemblies 44 located outside of tube 8, bomb storage area 50 within the central tube 8, opposed rudders 20 positioned laterally from tube 8, jet engines 22 both within tube 8 and outboard to it, vortex spoiler 24 from approximately Section F rearward (the number 24 is marked both above and below airframe/fuselage 2), and the location of angled rear surface 86 (which also has a vortex spoiler 24) that provides clearance for improper/non-routine approach angle and elevator 26 (shown in FIG. 3) protection. It is contemplated that bomb storage area 50 could perhaps store fifty bombs, and or be converted to a passenger area adequate to carry eight hundred people on multiple levels (see FIG. 12).

FIG. 12 is a cross-sectional view of the most preferred embodiment of the present invention at its Section H, with its central tube 8, passenger/cargo area 58 within tube 8, bomb bay 60 within tube 8, fuel storage area 52 above tube 8 (which follows the curvature of tube 8) for protection from groundfire, retractable nose steering assemblies 44, wheel well covers/farings 72 and 74, bomb bay doors 76 and 78 (shown in opened positions), inner cargo door 54 (shown in an opened position), and outer cargo door 56 that further functions as a passenger ramp (also shown in an opened position), vortex spoiler 24 locations (wherein C is a point on the Line C shown in FIG. 1), and jounce 62 and rebound 64 geometry for one nose steering assembly 44, jounce clearance 70 to the airframe 2, with centerline 32 and work line 30 references also identified. FIG. 12 also shows nose steering assembly (bogie) in a stored/retracted position 66, the hydraulic cylinder 68 for nose steering assembly, isolation spacers 80 configured for fuel tank 52 safety, and inner skin/surface 92. The area marked with the word 'walkway' identifies a passageway for crew. The representations and positioning in FIG. 12 for various areas and doors identified above are for illustrative purposes only, and the present invention may include other similar features not shown.

Figure 13:
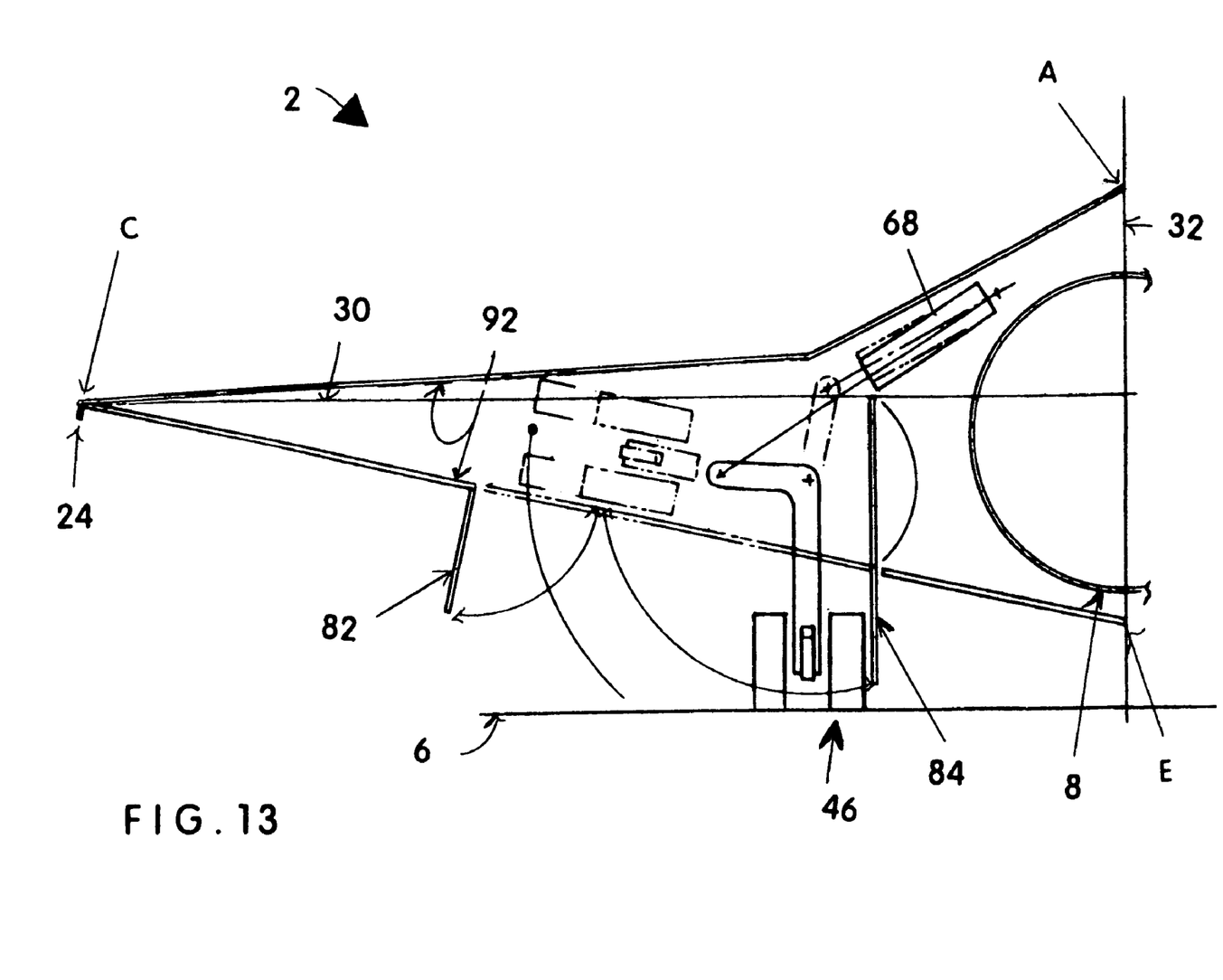
FIG. 13 is a cross-sectional view of the most preferred embodiment of the present invention at its Section T, with its central tube, retractable main gear, wheel well covers/farings, vortex spoiler, and the centerline and work line references also identified.

FIG. 13 is a cross-sectional view of the most preferred embodiment of the present invention at its Section T, with its central tube 8, retractable main gear 46, wheel well covers/farings 82 and 84, and the vortex spoiler 24 location (wherein C is a point on the Line C shown in FIG. 1), with the centerline 32, waterline 6, and work line 30 references also identified. FIG. 13 also has arrows from main gear 46 to show it in its retracted/stored position. The hydraulic cylinder 68 associated with main gear 46 is also shown. FIG. 13 further shows the points A and E, respectively on Lines A and E (shown in FIG. 1), at Section T. In addition, FIG. 13 shows the inner skin/surface 92 of airframe 2, and the concept point of suspension for main gear 46 at the unnumbered pivot point of main gear 46 identified in FIG. 13 by a "+" symbol.

FIGS. 14 and 15 respectively show airframe 2 from the front and rear. FIG. 14 is a front end view of the most preferred embodiment of the present invention with its Sections B-F, central tube 8, retractable nose steering assemblies 44, emergency nose wheel 14, lifting flaps 28 in a down position, wheel well covers/farings 72 and 74 in opened/down positions, acceleration area 4, windshield/canopy 40 for the pilot 10 (shown in FIGS. 1 and 2), and vortex spoiler 24 location (wherein C is a point on the Line C shown in FIG. 1), with the work line 30 reference also identified. The Line B' is also included, which represents the tangential start of the radii on Line B. In addition, FIG. 14 shows the inner skin/surface 92 of airframe 2. The point E (on the Line E in FIG. 1), which is shown in FIG. 13, is not shown in FIG. 14 as it would be directly behind emergency nose wheel 14. In contrast, FIG. 15 is a rear view of the most preferred embodiment of the present invention with its Sections K-W, central tube 8, jet engines 22 inside and outside tube 8, rear emergency wheel 18, retractable main gear 46, wheel well covers/farings 82 and 84 in opened/down positions, rudder/stabilizer 48, and work line 30 reference, with the vortex spoiler 24 shown at the trailing edge on one side also identified. FIG. 15 also identifies the smaller rear end portion 94 of the central tube 8. The point E (on the Line E in FIG. 1), which is shown in FIG. 13, is not shown in FIG. 15 as it would be directly behind rear emergency landing wheel 18. Middle emergency landing wheel 16 is not shown in FIGS. 14 and 15, as it is located on the centerline E of airframe 2 between emergency nose wheel 14 and rear emergency landing wheel 18.

The present invention has a blended wing body, and does not require conventional angled wings. Its dihedral shape (shown in FIGS. 4, 7, and 10) of the bottom surface (designated as all points B and lines B or BB in the illustrations provided) causes a pressure rise under airframe 2, and flaps 28 at the bottom of the leading edge help to reduce this effect during landings. Flaps 28 also help break the ground effect when taking off, but they do not need to be as large as in conventional aircraft. The dihedral shape of its bottom surface (designated as all points B and lines B or BB in the illustrations provided) also gives pilot 10 an option to ditch most preferred embodiment 100 in water when needing to make an emergency landing, as well as to make a wheels-up emergency landing on a hard runway surface, since the dihedral shape of its bottom surface (designated as all points B and lines B or BB in the illustrations provided) creates a compressed atmosphere under airframe 2. The present invention can also be converted for forest fire fighting applications where its tube 8 can hold water drawn by a snorkel or scoop, and then fly back to the area needing assistance.

I claim:

1. A strong aircraft that can be adapted for bomber, transporter, air-to-air fueling tanker, and space plane use, said aircraft comprising:
  a rhomboid airframe with a dihedral bottom surface and a top surface designed as an airfoil, said top surface also having a front portion with an accelerator ramp and said dihedral bottom surface configured to cause a pressure drop under said airframe during take-off and landings;
  a central tube within said airframe configured to provide a strong backbone for said aircraft, said tube extending substantially the full length of said airframe and adapted for housing items selected from a group consisting of munitions, passengers, and cargo;
  a canopy and a portion of said tube configured for providing a location to house a pilot;
  at least one fuel tank positioned above said tube;
  at least two flaps within said bottom surface configured for breaking pressure drop under the airframe and permitting upward movement of nose movement for take-off instead of tail down movement; and
  a tail assembly adapted for stability of said airframe during ground movement and flight.

2. The aircraft of claim 1 further comprising forward and rear retractable landing gear assemblies each providing a wide stance and configured to be strong for supporting heavy munitions and cargo loads housed in said tube.

3. The aircraft of claim 1 wherein materials for said tube is selected from rigid materials, bulletproof material, carbon fiber, aramid fiber, adhesives, and rolled aluminum.

4. The aircraft of claim 1 wherein said dihedral configuration provides radar deflecting stealth characteristics.

5. The aircraft of claim 1 wherein said tube is approximately twenty feet in diameter, said airframe exceeds one hundred feet in width dimension and exceeds three hundred feet in length dimension, and wherein said tube is sectioned by at least one easily installed airtight bulkhead.

6. The aircraft of claim 1 further comprising a plurality of emergency landing wheels depending from said bottom surface.

7. The aircraft of claim 6 wherein at least one of said emergency landing wheels is retractable.

8. The aircraft of claim 6 wherein said airframe has a configuration lacking conventional wings that improves its survival when subjected to combat abuse and improves parking capability.

9. The aircraft of claim 1 wherein said bottom surface is configured so that pressure thereunder upon landing is sufficient to be a cushion upon landing, during both routine landings and emergency landings.

10. The aircraft of claim 1 wherein said tube is configured for gun ship applications.

11. The aircraft of claim 1 wherein said top and bottom surfaces are both configured to provide lift for said airframe.

12. The aircraft of claim 1 further comprising vortex spoiler means on airframe adapted to prevent vortices from forming behind said aircraft so that multiple ones of said aircraft can be permitted to follow closely behind one another in flight.

13. The aircraft of claim 12 wherein said vortex spoiler means is positioned along said aircraft immediately rearward from said accelerator ramp.

14. The aircraft of claim 1 wherein said accelerator ramp is positioned on said top surface rearward from a pilot and the remaining portion of said airframe is configured to provide the pilot with good downward observation.

15. The aircraft of claim 1 wherein all of said top surface is configured for providing lift for said airframe.

16. The aircraft of claim 1 wherein said airframe has at least one jet engine and an air intake for said jet engine through said top surface near said tail assembly.

17. The aircraft of claim 1 wherein said at least one jet engine is positioned at the rear of said aircraft in a location for easy maintenance access.

18. The aircraft of claim 1 wherein said airframe has at least one rocket engine and appropriate storage for rocket fuel.

19. The aircraft of claim 1 further comprising engine monitoring equipment adapted for monitoring said rocket engine in flight.

20. The aircraft of claim 1 wherein said tube is sectioned by at least one airtight bulkhead.

* * * * *